(12) United States Patent
Kriger

(10) Patent No.: US 8,552,661 B2
(45) Date of Patent: Oct. 8, 2013

(54) MULTI-ENERGY VEHICLE ILLUMINATING SYSTEM AND METHOD

(76) Inventor: Yefim Kriger, Ansonia, CT (US)

( * ) Notice: Subject to any disclaimer, the term of this patent is extended or adjusted under 35 U.S.C. 154(b) by 479 days.

(21) Appl. No.: 12/913,518

(22) Filed: Oct. 27, 2010

(65) Prior Publication Data
US 2011/0096558 A1 Apr. 28, 2011

Related U.S. Application Data

(60) Provisional application No. 61/279,935, filed on Oct. 28, 2009.

(51) Int. Cl.
*H05B 37/02* (2006.01)
(52) U.S. Cl.
USPC .................... 315/291; 315/307; 315/309
(58) Field of Classification Search
USPC ............. 315/76–77, 80, 149, 155–158, 291, 315/294–295, 297, 307–309; 362/459, 514, 362/516, 520; 180/54.1, 65.1, 65.24, 65.29
See application file for complete search history.

(56) References Cited

U.S. PATENT DOCUMENTS

| 2008/0093143 A1* | 4/2008 | Harrison | 180/165 |
| 2009/0314556 A1* | 12/2009 | Harris | 180/65.1 |

* cited by examiner

*Primary Examiner* — Jimmy Vu
*Assistant Examiner* — Henry Luong
(74) *Attorney, Agent, or Firm* — Cantor Colburn LLP

(57) ABSTRACT

A vehicle multi-energy illuminating system is disclosed. The system having at least one multi-energy source module configured to collect waste energy from a vehicle headlamp, the at least one a multi-energy source module having at least one photovoltaic device configured to collect infrared energy and at least one photovoltaic device configured to collect visible light energy from the vehicle headlamp: at least one solar energy source module configured to collect visible light energy not generated from the vehicle headlamp bulb; a rechargeable battery coupled to the least one multi-energy source module and the at least one solar energy source module, the rechargeable battery being configured to collect and store the waste energy from the headlamp bulb and the visible light energy not generated from the vehicle headlamp bulb; a safety light; a light sensor; and a microcontroller coupled to the rechargeable battery, the safety light and the light sensor, wherein the microcontroller illuminates the safety light by coupling the safety light to the rechargeable battery when the light sensor provides a signal to the microcontroller indicating that detected light is below a predetermined value.

20 Claims, 2 Drawing Sheets

MULTI-ENERGY VEHICLE ILLUMINATING SYSTEM AND METHOD

CROSS REFERENCE TO RELATED APPLICATIONS

This application claims the benefit of U.S. Provisional Patent Application Ser. No. 61/279,935 filed Oct. 28, 2009, the contents of which are incorporated herein by reference thereto.

FIELD OF THE INVENTION

The present invention relates to systems and methods of powering lights of passenger vehicles, especially all-day lights on, hybrid and electrical vehicles, trucks, motorcycles, trains, ships, even boats, all of which are simply called vehicles and more particularly to systems and methods that employ a thermal and light energy dispersed by a vehicle regular illuminating light bulb and solar energy to power the emergency and parking lights of the vehicle that further in the text are called safety lights when the electrical system of the vehicle is turned off and the vehicle regular electrical sources are not available.

BACKGROUND OF THE INVENTION

There are different kinds of vehicle illuminating and safety lights. A vehicle headlight assembly, for example, may be equipped with a light source, at least one reflecting surface, a projection lens, and a shutter located in the vicinity of a focus of the projection lens. Light rays reflected by the reflecting surface and directly coming from the light source provide a focused image of light. The projection lens projects the focused image of light into a forward direction and illuminates a predetermined area on a road. The shutter cuts off an unnecessary portion of light for the formation of light distribution pattern of the vehicle light. The unnecessary portion of light is typically a portion which generally illuminates in the direction of the vehicle, which can be a glare light to a driver of a car driving in an on-coming lane.

The light source of the vehicle headlight and all other vehicle warning, illuminating, safety, tail, brake, stop, etc. lights may consist of an incandescent bulb, a halogen source, a light emitting diode (LED) based source, etc. All these types of light sources are powered by the vehicle electrical system. The lights are typically dark when an engine is shut down. From a safety point of view, it is important to keep the vehicle light turned on as an emergency or safety light when a vehicle is parked, especially during the dark part of day. But the operator of a vehicle can't leave them turned on for a long period of time when the engine is shut down because a battery will become discharged.

There is a need for a method and system to collect and save multi-energy to power the emergency and parking lights when the regular vehicle electrical sources are not available.

SUMMARY OF THE INVENTION

A system and method to collect and store thermal (infrared) and light (visible) energy dispersed by a vehicle regular illuminating light and, together with also collected and stored solar energy, to employ this combined stored multi-energy to power the safety lights of this vehicle and to use the rest of this stored multi-energy to power an electrical system of the vehicle or any its units are presented.

The present invention provides a method and system to collect and store thermal and light energy dispersed by a regular vehicle light source and use this stored multi-energy to power the safety lights when the electrical system of said vehicle is turned off and its regular electrical sources are not available.

In one embodiment, a vehicle multi-energy illuminating system is disclosed. The system having at least one multi-energy source module configured to collect waste energy from a vehicle headlamp, the at least one a multi-energy source module having at least one photovoltaic device configured to collect infrared energy and at least one photovoltaic device configured to collect visible light energy from the vehicle headlamp: at least one solar energy source module configured to collect visible light energy not generated from the vehicle headlamp bulb; a rechargeable battery coupled to the least one multi-energy source module and the at least one solar energy source module, the rechargeable battery being configured to collect and store the waste energy from the headlamp bulb and the visible light energy not generated from the vehicle headlamp bulb; a safety light; a light sensor; and a microcontroller coupled to the rechargeable battery, the safety light and the light sensor, wherein the microcontroller illuminates the safety light by coupling the safety light to the rechargeable battery when the light sensor provides a signal to the microcontroller indicating that detected light is below a predetermined value.

In another embodiment, a method of illuminating a safety light of a vehicle is provided. The method having the steps of: collecting waste energy from a vehicle headlamp bulb with at least one multi-energy source module, the at least one a multi-energy source module having at least one photovoltaic device configured to collect infrared energy from the vehicle headlamp bulb and at least one photovoltaic device configured to collect visible light energy from the vehicle headlamp bulb: collecting visible light energy not generated from the vehicle headlamp bulb with at least one solar energy source module; storing the collected solar energy and the collected waste energy in a rechargeable battery coupled to the least one multi-energy source module and the at least one solar energy source module, the rechargeable battery being electrically coupled to the at least one solar energy module and the at least one multi-energy source module; and illuminating a safety light by coupling the rechargeable battery to the safety light when a light sensor provides a signal indicative of light below a predetermined value, wherein the rechargeable battery, the safety light, the light sensor, the at least one solar energy module and the at least one multi-energy source module are coupled to a microcontroller, wherein the microcontroller illuminates the safety light by coupling the safety light to the rechargeable battery when the light sensor provides the signal to the microcontroller indicating that detected light is below the predetermined value.

BRIEF DESCRIPTION OF THE DRAWING

The above and other objects, features, and advantages will become more readily apparent from the following description, reference being made to the accompanying drawing in which.

DETAILED DESCRIPTION

Figure 1:
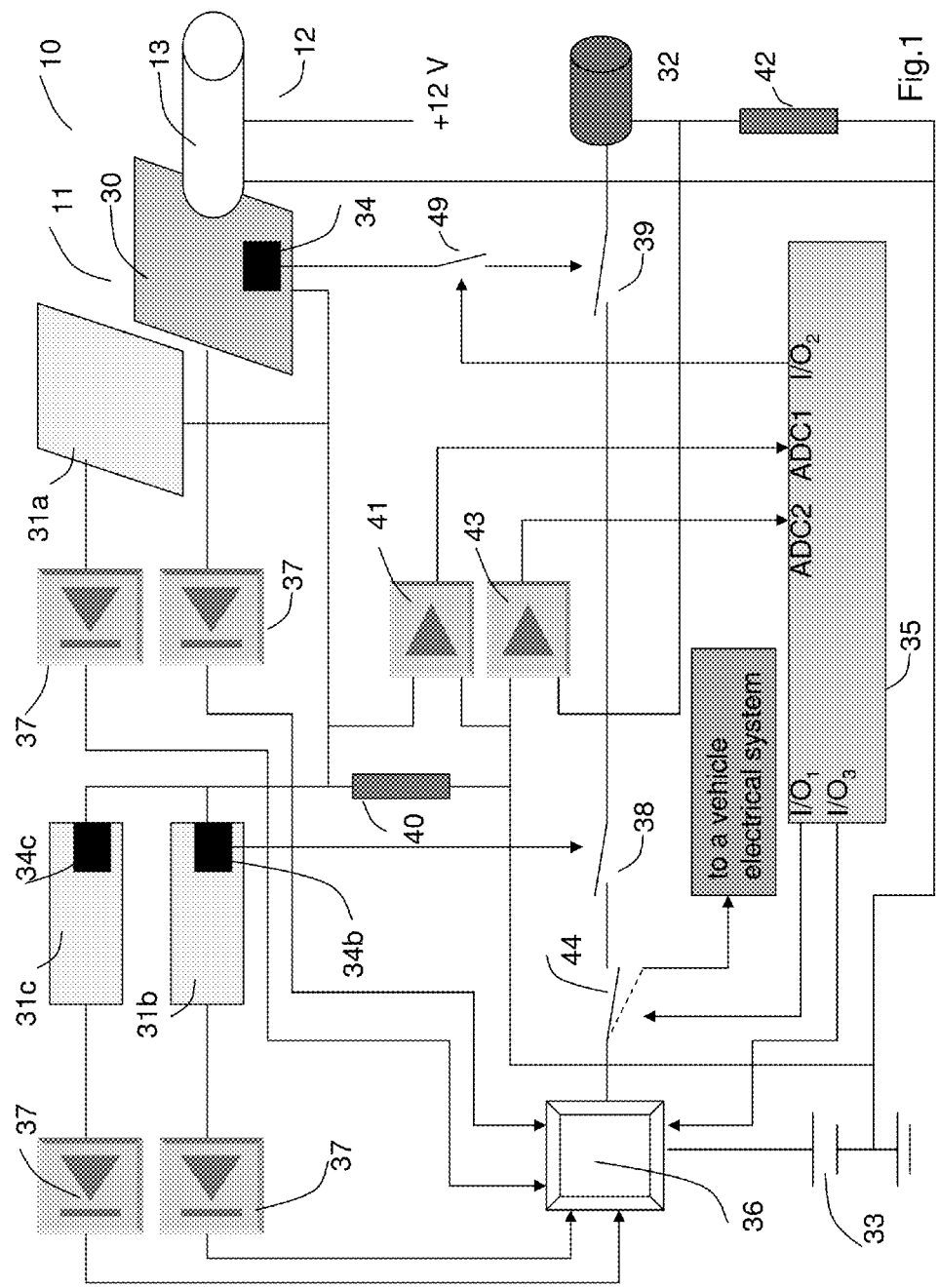
FIG. 1 is a schematic diagram of the Multi-Energy vehicle Light system.

In accordance with an exemplary embodiment of the present invention a method and system are provided that collect and employ the two different types of energy (Multi-Energy)—infrared and visible light energy—to keep a vehicle safety lights turned on when the vehicle is parked, especially in darkness, and the electrical system of the vehicle is turned off, powered by energy that was collected and saved by a multi-energy source (MES) module, and the method comprises Multi-Energy Illuminating Technology (MUEL-T). As used herein and in one non-limiting exemplary embodiment Multi-Energy Illuminating Technology is the combination of a multi-energy source module having at least one photovoltaic device configured to collect infrared energy from the vehicle headlamp bulb or other vehicle surface and at least one photovoltaic device configured to collect visible light energy from the vehicle headlamp bulb or other vehicle surface and at least one solar energy source module.

Another exemplary embodiment of the present invention allows a method to improve safety of any vehicle by powering its safety lights at night or in darkness independent of weather conditions when the vehicle is in an emergency situation or parked, and an electrical system of the vehicle is not available at that time.

Another exemplary embodiment allows a system for powering vehicle's safety lights at night or in darkness independent of weather conditions when the vehicle is in an emergency situation or parked, and an electrical system of the vehicle is not then available.

Yet another exemplary embodiment of the present invention is that a safety light of a Multi-Energy vehicle Light (MUEL) system is powered by the two types of energy to keep the vehicle safety lights turned on at the discretion of an operator when the vehicle is parked and an electrical system of the vehicle is not available.

In addition, and as yet another exemplary embodiment of the present invention, the multi-energy MUEL system accomplished by the MUEL-T technology includes the two energy sources. The first energy source of the MUEL system and method is the multi-energy source MES module that collects and transforms to electricity by photovoltaic devices and stores by rechargeable battery a thermal and light energy dispersed by a vehicle regular illuminating light bulb such as a headlight when the light is turned on.

The MES module collects the waste light and infrared energy of a vehicle regular illuminating light bulb at any time when the MUEL light bulb, which is next to the MES module, is turned on at the discretion of the operator of the vehicle. In exemplary embodiment, one set of the photovoltaic devices of the MES module accomplished by the MUEL-T technology is designated to convert waste light energy of a vehicle regular illuminating light bulb to electrical energy and has light wavelength. This set of the photovoltaic devices may be fixed on the side of the MES module that is closer to the MUEL light bulb.

The second set of the photovoltaic devices of the MES module accomplished by the MUEL-T technology is designated to convert waste infrared energy of a vehicle regular illuminating light bulb to electrical energy and has an infrared wavelength. This set of the photovoltaic devices may be fixed on the other side of the MES module.

As an alternative embodiment another than photovoltaic suitable type of energy converters may be employed to transform to electricity the waste heating energy dispersed by the MUEL light bulb. For example, flat nanoantenna (nantenna) electromagnetic collectors (NECs) may be used for producing electricity from thermal energy. NEC devices target mid-infrared wavelengths where conventional photovoltaic solar cells are inefficient. Nantennas with embedded rectifiers into the antenna structures can collect as well as convert into electricity waste heating energy dispersed by the MUEL vehicle regular illuminating light bulb.

Additionally, the internal lateral surfaces and bottom surface of a MUEL light assembly around the bulb may be covered by the flat nanoantenna (nantenna) electromagnetic collectors with embedded rectifiers, which in this case will work as collectors of thermal energy, coolers of inside temperature, and reflectors of the bulb of the MUEL light assembly.

The second energy source of the MUEL system and method is a Solar Energy Source (SES) module that consists of photovoltaic devices that have light wavelength. The goal of the SES module is to provide MUEL system with solar energy, and it may be located at any appropriate part of the MUEL system that provides access to solar energy.

Another exemplary embodiment of the present invention is that a SES module and a MES module accomplished by the MUEL-T technology may be manufactured as a combined "sandwich" (MESES) module, in which the MES module is located next to a MUEL light bulb, and the SES module on another side of the MESES module has access to the sunlight.

Exemplary embodiments of the present invention allow a MUEL light accomplished by the MUEL-T technology to consist at least one MES module or at least one MES module and at least one SES module or at least one MESES module or at least one MESES module and at least one SES module.

A schematic diagram of the preferred embodiment of the MUEL system 10 accomplished by the MUEL-T technology is shown in FIG. 1. A vehicle multi-energy MUEL system 10 consists of the MES module 30 that is a part of the MESES "sandwich" energy collector 11, which collects both solar energy and waste visible (light) and heating (infrared) energy of the light bulb 13, the SES modules 31*a*, 31*b*, 31*c*, where the first of which is a part of the MESES "sandwich" 11, and all of these SES modules collect solar energy and are connected to the rechargeable battery 33 through the diodes 37, which prevent the battery's current from flowing back through the photovoltaic module, the vehicle safety light 32 that may be a light emitting diode (LED) based or other lighting source, the light sensors 34, 34*b*, 34*c*, the microcontroller unit 35, the charger 36, the switches 38, 39, 44, 49, the measurement resistors 40, 42, and operational amplifiers 41, 43. At night the photovoltaic modules 31*a*, 31*b*, and 31*c* stop to produce energy from solar light. The light sensor 34*b* turns on vehicle safety light 32 through switch 38 in darkness if vehicle headlight bulb 13 of the light 12 is not turned on and switch 39, controlled by the light sensor 34 is not turned off. When the rechargeable battery 33 is charged, vehicle safety light 32 will shine at night or in darkness and will provide safe parking of a vehicle or safe location of the vehicle on a road in case of an emergency stop.

In addition, and as yet another exemplary embodiment of the present invention, the MUEL system accomplished by the MUEL-T technology is configured with a microcontroller unit (MCU) 35 that monitors energy collected by MES 30 and SES 31 modules by use of a voltage drop across resistor 40. This voltage is amplified by an operational amplifier 41 and is processed by the MCU 35 on its ADC1 (Analog-to-Digital Converter) terminal. The amount of energy delivered to the rechargeable battery 33 is memorized by MCU 35. The MCU 35 monitors the energy lost by a rechargeable battery 33 while serving the safety light by analyzing a voltage drop across resistor 42. This voltage is amplified by operational amplifier 43 and is processed by the MCU 35 on its ADC2 terminal. When light sensor 34*b* of the SES module turns off the safety light in a sunny morning, the MCU calculates the residual of the collected energy by the MUEL. If enough energy is left, MCU through its terminal $I/O_1$ switches the output terminal of the rechargeable battery through switch 44 from the position of providing service to the safety light 32 line to the position of powering any electrical energy consumer line of the vehicle electrical system.

Yet another exemplary embodiment of the present invention is that the multi-energy MES module 30 of the MUEL system accomplished by the MUEL-T technology is fixed next to the MUEL light bulb 13.

Another exemplary embodiment of the present invention is that the rechargeable battery may be fixed at the light assembly accomplished by the MUEL-T technology in the same way as a light bulb. If more than one rechargeable battery is used, they may be arranged in a parallel or a series combination.

Another exemplary embodiment of the present invention is that the rechargeable battery may be located in a special compartment in the hood of a vehicle and connected to the MUEL by the same connector to which a bulb is connected. Part of the schematic may be located in the same compartment as the rechargeable battery.

Another exemplary embodiment of the present invention is that there are openings in the MUEL assembly accomplished by the MUEL-T technology above the SES modules to get sunlight by the photovoltaic devices 31a, 31b, and 31c. The openings are closed by glass or other material that protects solar modules from mechanical damage and are transparent to solar energy.

Another exemplary embodiment of the present invention allows a retractable cover above the SES module of the MUEL.

Another exemplary embodiment of the present invention is that the vehicle MUEL system accomplished by the MUEL-T technology may store energy that it collects through MES module both light and infrared energy at any time when the light bulb of the MUEL is turned on and solar energy through SES modules on sunny days. MUEL system may store energy that it collects through both MES and SES solar energy on sunny days when the light bulb of the MUEL is turned off.

Another exemplary embodiment of the present invention is that location of the SES module may be anywhere in the MUEL system. If the size of the vehicle light assembly allows, there may be more than one SES module in the MUEL light accomplished by the MUEL-T technology.

Figure 2:
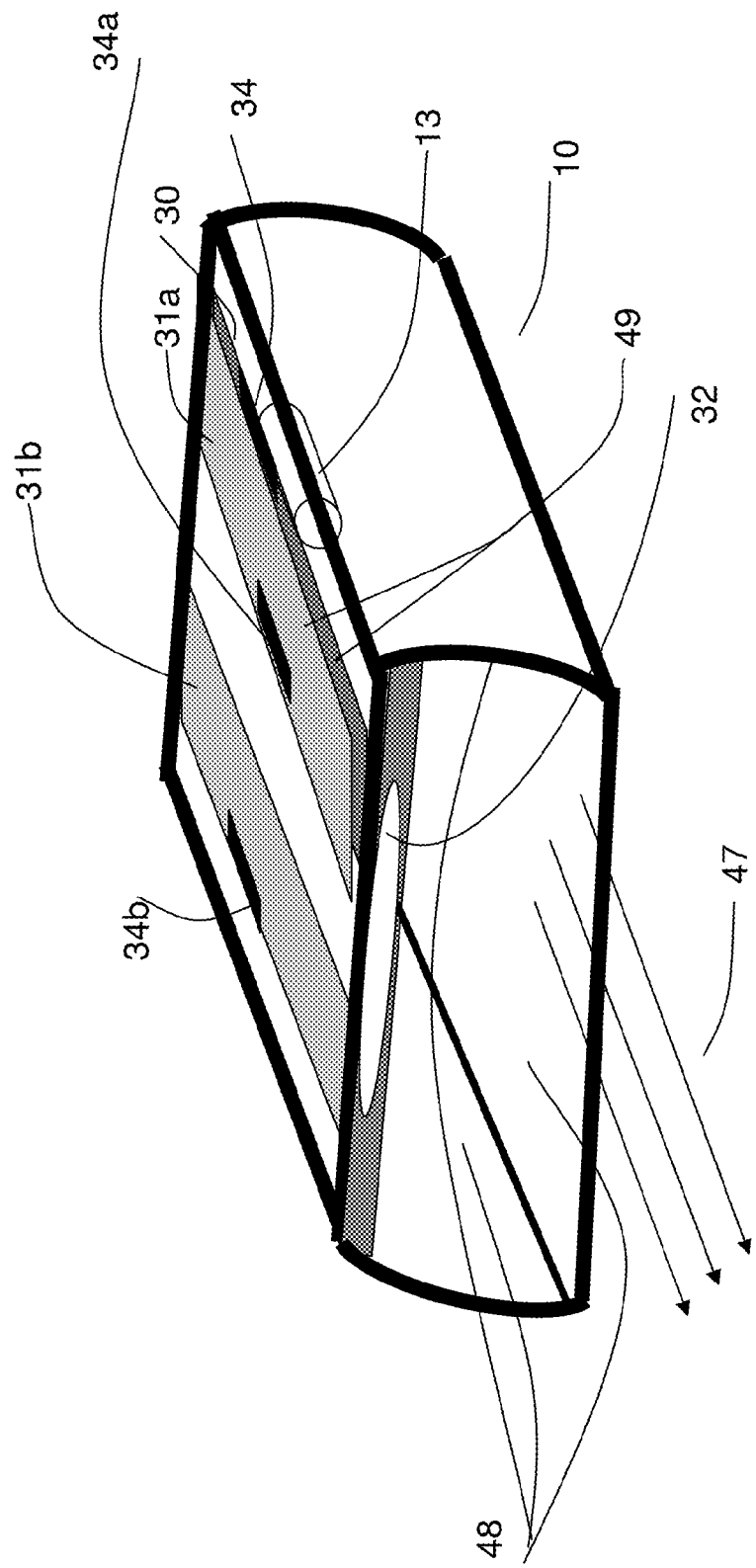
FIG. 2 is a simplified Multi-Energy vehicle Light system headlight assembly.

FIG. 2 shows a simplified MUEL system 10 headlight assembly accomplished by the MUEL-T technology. A MUEL assembly consists of a headlight bulb 13, a sandwich MESES 49, and safety light 32. The sandwich MESES 49 in turn consists of a MES module 30 and SES module 31a. The MES module 30 located next to the light bulb 13 and includes a light sensor 34. The SES module 31a located above the MES module 30 and includes a light sensor 34a. The MUEL assembly also consists of another SES module 31b, which includes a light sensor 34b. FIG. 2 also shows a direction of a headlight beam 47. The two internal lateral surfaces and bottom surface 48 of the MUEL assembly are employed as reflectors. The MES module 30 collects both waste light and waste infrared energy dispersed by the light bulb 13 of the MUEL system at any time when it is turned on. The SES module 31a and SES module 31b both collect solar energy on sunny days.

Another exemplary embodiment of the present invention is that depending on an internal structure of the MUEL light assembly where the location of modules accomplished by the MUEL-T technology is chosen in a way when they collect the most of infrared and visible energy. Each employed MES and SES module may contain at least one light sensor.

Yet another exemplary embodiment of the present invention is that each MES module light of the MUEL system accomplished by the MUEL-T technology is located in the area of the vehicle illuminating light bulb in which it consumes most of the waste by the bulb thermal and light energy and does not disturb the characteristics of the light, and the ambient temperature of the MES is in the allowed range.

In addition, and as yet another exemplary embodiment of the present invention, the two or more regular vehicle lights (for example, headlights, parking lights, side-marker lights, etc.) may be combined in one assembly to create a Combined MUEL (COMUEL) light system accomplished by the MUEL-T technology.

Yet another exemplary embodiment of the present invention is that each SES module of the MUEL system accomplished by the MUEL-T technology is located in the area of the light assembly where it consumes most of the solar energy and does not disturb the characteristics of the light, and the ambient temperature of the SES is in the allowed range.

Table 1 shows the conditions of the rechargeable battery and safety light of a MUEL system accomplished by the MUEL-T technology depending on weather and time of day.

Another exemplary embodiment of the present invention is that the charger 36 is used to prevent the rechargeable battery from overcharging by employing the signal $I/O_3$ of the MCU 35. The charger 36 may also be employed when there is more than one SES module. The charger and rechargeable battery may be fixed in the MUEL assembly or outside of it.

TABLE 1

| 1 | | Position of an illuminating light switch | | | |
| --- | --- | --- | --- | --- | --- |
| | | On | | Off | |
| 2 | Weather, time of day | Sunny | Darkness | Sunny | Darkness |
| 3 | MES | | | | |
| 4 | Energy to charge | + | + | +/− | − |
| 5 | Light sensor output | Off | Off | Off | On |
| 6 | SES | | | | |
| 7 | Energy to charge | + | − | + | − |
| 8 | Light sensor output | Off | On | Off | On |
| 9 | MUEL | | | | |
| 10 | Energy to charge | + | + | + | − |
| 11 | Battery | | | | |
| 12 | Charging | + | + | + | − |
| 13 | Discharging | − | − | − | + |
| 14 | Safety light | Off | Off | Off | On |

Another exemplary embodiment of the present invention is that the charger 36 is used to prevent the rechargeable battery from overcharging by employing the signal $I/O_3$ of the MCU 35. The charger 36 may also be employed when there is more than one SES module. The charger and rechargeable battery may be fixed in the MUEL assembly or outside of it.

Yet another exemplary embodiment of the present invention in which a regular rotating switch may be used to turn off a safety light of a MUEL system accomplished by the MUEL-T technology or an automatic turn of the safety light may be adjusted by the operator of the vehicle through switch 49 and $I/O_2$ terminal of the MCU 35.

In addition, and as yet another exemplary embodiment of the present invention, all features of the MUEL-T technology as it is described for a vehicle headlight above related to all types of possible lights of the passenger vehicles, especially all-day lights on, hybrid and electrical vehicles, trucks, motorcycles, trains, ships, even boats in which the lights are realized as the MUEL-type safety lights.

In still yet another alternative exemplary embodiment the method and system accomplished by the MUEL-T technology may employ a vehicle SLI (starting, lightning, and ignition) battery through a charger 36 as a main storage of the multi-energy collected by the MUEL system. In this case the vehicle SLI battery powers the safety light if the MUEL system saves energy enough.

In addition, and as yet another exemplary embodiment of the present invention, a collector of infrared energy may be fixed on a hot surface of a vehicle engine and may collect its thermal energy that may be combined with the energy saved by of a MUEL system accomplished by the MUEL-T technology.

The multi-energy MUEL system accomplished by the MUEL-T technology for powering emergency and parking lights is more reliable than any other solar emergency and parking system because MUEL system provides power to the emergency and parking lights independently of the weather.

In various embodiments a vehicle multi-energy illuminating (MUEL) system that provides energy sources is disclosed. In one embodiment the system collects and stores thermal and light energy dispersed by a vehicle regular illuminating light bulb and also provide energy sources that collect solar energy, and the MUEL system uses combined collected and stored multi-energy to power safety lights of providing energy sources, which collect and store a thermal and light energy dispersed by a vehicle regular illuminating light bulb and also providing energy sources that collect solar energy, and the MUEL system uses combined collected and stored multi-energy to power safety lights of the vehicle when an electrical system of the vehicle is turned off and its regular electrical sources are not available, and employs the rest of the stored energy to power the electrical system of the vehicle or any its units.

In one non-limiting embodiment, the energy sources are: at least one multi-energy source (MES) module that is next to the vehicle regular illuminating light bulb and employs a photovoltaic devices to collect: a. Visible (light) waste energy of the vehicle regular illuminating light bulb; b. Heating (infrared) waste energy of the vehicle regular illuminating light bulb; and at least one photovoltaic Solar Energy Source (SES) module that collects solar energy.

In another embodiment, the vehicle multi-energy illuminating MUEL system consists of at least one multi-energy MES module, at least one Solar Energy Source SES module, and all of the modules are connected to a rechargeable battery through the diodes, which prevent the battery's current from flowing back through the modules, a vehicle safety light, a rechargeable battery, a darkness or light sensor(s), a microcontroller unit MCU, a charger, the switches, the measurement resistors, the operational amplifiers, and multi-energy MES module in turn consists of at least one set of the photovoltaic devices that is designated to convert waste infrared energy of the illuminating light bulb to electrical energy and has an infrared wavelength, and the second set of the photovoltaic devices of the MES module is designated to convert waste light energy of the vehicle regular illuminating light bulb to electrical energy and has visible light wavelength.

In one implementation, the MCU monitors energy collected by MES and SES modules by use of a voltage drop across measurement resistor, and the voltage drop is connected to and amplified by an operational amplifier and after that it is connected to and processed by the MCU, which memorizes the amount of energy delivered to the rechargeable battery. In another implementation, the MCU monitors energy lost by the rechargeable battery, while serving the safety light, by use of a voltage drop across measurement resistor, and the voltage drop is connected to and amplified by an operational amplifier and further it is connected to and processed by the MCU, which monitors the amount of saved energy.

In an exemplary embodiment and in a sunny morning, when darkness or light sensor sends a signal to the MCU to turn off the safety light, the MCU calculates the residual of the collected energy by the MUEL system and, if enough energy is left, the MCU through its I/O terminal switches the output terminal of the rechargeable battery from a position of providing service to the safety light line to the position of powering any predetermined electrical energy consumer line of the vehicle electrical system.

During operation the photovoltaic devices of the SES module stop producing power from solar light at night and the darkness sensor at the discretion of a operator of the vehicle turns on the vehicle safety light through a switch in darkness if the vehicle regular headlight bulb is not turned on and switch, controlled by the darkness sensor is not turned off.

In yet another embodiment, the multi-energy MES module and the SES module are manufactured together as one "sandwich" MESES module, in which the MES module is fixed next to the vehicle regular headlight bulb and the SES module is fixed on another side of the MESES module and has access to the sunlight. Still further and in one embodiment, the system comprises a vehicle regular headlight bulb, a sandwich MESES, vehicle safety light, and the sandwich MESES in turn consists of the MES module and the SES module, and the MES module located next to the vehicle regular headlight bulb and includes a darkness sensor, and the SES module is located above the MES photovoltaic module and includes a darkness sensor, and the headlight assembly of the MUEL system also consists another SES module, which includes a darkness sensor, and the two internal lateral surfaces and bottom surface of a vehicle regular illuminating light around of the bulb of the MUEL system assembly are employed as reflectors.

In yet another implementation, two or more regular vehicle lights such as headlight, parking light, side-marker light, tail light, brake light, stop light, etc. are combined in one assembly to create a vehicle combined multi-energy illuminating system (COMUEL). Still further, the headlight assembly of the MUEL system includes a charger that prevents the rechargeable battery from overcharging by employing an I/O terminal of the MCU.

In another embodiment, the multi-energy MES module consists of infrared flat nanoantenna (nantenna) electromagnetic collectors (NECs) with embedded rectifiers into the antenna structures to convert waste infrared energy of the illuminating light bulb into electricity and have an infrared wavelength, and the internal lateral surfaces and bottom surface of a MUEL light assembly around of the bulb are covered by the infrared flat NECs with embedded rectifiers, which in this case will work as collectors of thermal energy, coolers of inside temperature, and reflectors of the MUEL light assembly.

Still further and in one mode of operation, a vehicle SLI (starting, lightning, and ignition) battery is connected to the charger as a main storage of the multi-energy collected by the MUEL system and the vehicle SLI battery powers the safety light through the MCU and a control circuit. In another embodiment, the infrared flat NECs with embedded rectifiers are fixed on a hot surface of a vehicle engine and collect thermal energy dispersed by the engine that is combined with other energy saved by the MUEL system to power emergency and safety vehicle lights.

As also disclosed herein, a multi-energy method of powering a vehicle safety lights by collecting and storing thermal (infrared) and light (visible) energy dispersed by a vehicle regular illuminating light bulb and also collecting and storing visible solar energy and employing this combined stored multi-energy to power safety lights of the vehicle when its regular electrical sources are not available is provided, wherein visible solar energy is collected by a visible solar energy (SES) photovoltaic module, and the both infrared and visible energy dispersed by the vehicle regular illuminating light bulb are collected simultaneously by a multi-energy (MES) module that consists of both an infrared and a visible light collectors accordingly, and the collectors have different wavelength, and the collectors and converters of visible and infrared energy into electrical energy are any type.

Here, the multi-energy module MES collects energy from the vehicle regular illuminating light bulb at any time when the light bulb, which is next to the MES module, is turned on at the discretion of the operator of the vehicle, and the solar energy SES module collects energy at any sunny day. In another mode of operation, the infrared part of the multi-energy MES module collects thermal energy dispersed by the vehicle regular illuminating light bulb, is accomplished by infrared flat nanoantenna electromagnetic collectors (NECs) with embedded rectifiers to convert infrared energy into electricity, and the multi-energy MES module is combined with the visible solar energy SES module as a "sandwich" MESES, in which the visible light photovoltaic devices of the multi-energy module MES are fixed next to the vehicle regular headlight bulb, and the SES photovoltaic module on the other side of the MESES has access to the sunlight, and the two internal lateral surfaces and bottom surface of the MUEL light are covered by the infrared flat NECs collectors with embedded rectifiers, which are employed as collectors of thermal energy, coolers of inside temperature, and reflectors of the bulb of the MUEL light assembly.

As discussed above and in one implementation, the multi-energy module MES is combined with the visible solar energy SES module as a "sandwich" MESES module, in which the visible light photovoltaic devices of the multi-energy module MES are fixed next to the vehicle regular headlight bulb, and the SES photovoltaic module on the other side of the MESES has access to the sunlight, and there are openings in the MUEL assembly accomplished by the MUEL-T technology above the SES module to get sunlight, and the openings are closed by glass or other material that protects MUEL from mechanical damages and are transparent to solar energy, and the "sandwich" MESES module may be manufactured, sold, and employed as a separate multi-energy converter and saver.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the described features.

What is claimed is:

1. A vehicle multi-energy illuminating system, comprising:
    at least one multi-energy source module configured to collect waste energy from a vehicle headlamp bulb, the at least one multi-energy source module having the at least one photovoltaic device further configured to collect infrared energy and at least one photovoltaic device configured to collect visible light energy from the vehicle headlamp bulb:
    at least one solar energy source module configured to collect visible light energy not generated from the vehicle headlamp bulb;
    a rechargeable battery coupled to the least one multi-energy source module and the at least one solar energy source module, the rechargeable battery being configured to collect and store the waste energy from the vehicle headlamp bulb and the visible light energy not generated from the vehicle headlamp bulb;
    a safety light;
    a light sensor; and
    a microcontroller coupled to the rechargeable battery, the safety light and the light sensor, wherein the microcontroller illuminates the safety light by coupling the safety light to the rechargeable battery when the light sensor provides a signal to the microcontroller indicating that detected light is below a predetermined value.

2. The vehicle multi-energy illuminating system as in claim 1, wherein the microcontroller is coupled to a vehicle headlamp and wherein the safety light is not illuminated if the vehicle headlamp is illuminated.

3. The vehicle multi-energy illuminating system as in claim 1, wherein the vehicle headlamp bulb is located next to the at least one multi-energy source module and the least one solar energy source module.

4. The vehicle multi-energy illuminating system as in claim 3, wherein the microcontroller is coupled to a vehicle headlamp and wherein the safety light is not illuminated if the vehicle headlamp is illuminated.

5. The vehicle multi-energy illuminating system as in claim 1, wherein the microcontroller monitors energy collected by the at least one multi-energy source module and the at least one solar energy source module by measuring a voltage drop across a measurement resistor, wherein the voltage drop is provided to and amplified by an operational amplifier coupled to the microcontroller, wherein the microcontroller is configured to determine an amount of energy delivered to the rechargeable battery by using the measured voltage drop.

6. The vehicle multi-energy illuminating system as in claim 1, wherein the microcontroller is configured to measure an amount of energy provided to the safety light by the rechargeable battery by measuring a voltage drop across a measurement resistor, and the measured voltage drop is provided to and amplified by an operational amplifier coupled to the microcontroller, wherein the microcontroller is configured to determine the amount of energy delivered by the rechargeable battery by using the measured voltage drop.

7. The vehicle multi-energy illuminating system as in claim 1, wherein the at least one multi-energy source module further comprises infrared flat nanoantenna electromagnetic collectors with embedded rectifiers configured to convert waste infrared energy of the vehicle headlamp bulb into electricity.

8. The vehicle multi-energy illuminating system as in claim 1, wherein the vehicle headlamp bulb is surrounded by surfaces of infrared flat nanoantenna electromagnetic collectors, which are configured to convert waste infrared energy of the vehicle headlamp bulb into electricity and comprise a portion of a reflector of a vehicle headlamp.

9. A vehicle headlamp assembly, comprising:
    a lamp having a reflector surface;
    at least one multi-energy source module comprising a portion of the reflector surface and configured to collect waste energy from the lamp, the at least one multi-energy source module having at least one photovoltaic device configured to collect infrared energy and the at least one photovoltaic device configured to collect visible light energy from the lamp:

at least one solar energy source module configured to collect through openings in the headlamp assembly light energy not generated from the lamp;

at least one vehicle safety light configured to be powered by at least one multi-energy source module and at the least one solar energy source module;

microcontroller configured to monitor amount of energy collected by the at least one multi-energy source module and the at least one solar energy source module and amount of energy delivered by the rechargeable battery to the safety light and configured to transmit a residual of the collected energy to power any electrical energy consumer line of the vehicle electrical system or save it in the same; and a rechargeable battery coupled to the least one multi-energy source module and the at least one solar energy source module, the rechargeable battery being configured to collect and store the waste energy from the lamp and the visible light energy not generated from vehicle lamp.

10. The vehicle headlamp assembly as in claim 9, wherein the at least one multi-energy source module further comprises infrared flat nanoantenna electromagnetic collectors with embedded rectifiers configured to convert waste infrared energy of the lamp into electricity.

11. A method of illuminating a safety light of a vehicle comprising:

collecting waste energy from a vehicle headlamp bulb with at least one multi-energy source module, the at least one a multi-energy source module having at least one photovoltaic device configured to collect infrared energy from the vehicle headlamp bulb and the at least one photovoltaic device configured to collect visible light energy from the vehicle headlamp bulb:

collecting visible light energy not generated from the vehicle headlamp bulb with at least one solar energy source module;

a collected solar energy and the collected waste energy in a rechargeable battery coupled to the least one multi-energy source module and the at least one solar energy source module, the rechargeable battery being electrically coupled to the at least one solar energy module and the at least one multi-energy source module; and illuminating a safety light by coupling the rechargeable battery to the safety light when a light sensor provides a signal indicative of light below a predetermined value, wherein the rechargeable battery, the safety light, the light sensor, the at least one solar energy module and the at least one multi-energy source module are coupled to a microcontroller, wherein the microcontroller illuminates the safety light by coupling the safety light to the rechargeable battery when the light sensor provides the signal to the microcontroller indicating that detected light is below the predetermined value.

12. The method as claim 11, wherein the microcontroller is coupled to the vehicle headlamp and wherein the safety light is not illuminated if a vehicle headlamp is illuminated.

13. The method as in claim 11, wherein the vehicle headlamp bulb is located next to the at least one multi-energy source module and the least one solar energy source module.

14. The method as in claim 13, wherein the microcontroller is coupled to the vehicle headlamp and wherein the safety light is not illuminated if a vehicle headlamp is illuminated.

15. The method as in claim 11, wherein the microcontroller monitors energy collected by the at least one multi-energy source module and the at least one solar energy source module by measuring a voltage drop across a measurement resistor, wherein the voltage drop is provided to and amplified by an operational amplifier coupled to the microcontroller, wherein the microcontroller is configured to determine an amount of energy delivered to the rechargeable battery by using the measured voltage drop.

16. The method as in claim 11, wherein the microcontroller is configured to measure an amount of energy provided to the safety light by the rechargeable battery by measuring a voltage drop across a measurement resistor, and the measured voltage drop is provided to and amplified by an operational amplifier coupled to the microcontroller, wherein the microcontroller is configured to determine an amount of energy delivered by the rechargeable battery by using the measured voltage drop.

17. The method as in claim 11, wherein the at least one multi-energy source module further comprises infrared flat nanoantenna electromagnetic collectors with embedded rectifiers configured to convert waste infrared energy of the vehicle headlamp bulb into electricity.

18. The method as in claim 11, wherein the vehicle headlamp bulb is partially surrounded by surfaces of infrared flat nanoantenna electromagnetic collectors with embedded rectifiers, which are configured to convert waste infrared energy of the vehicle headlamp bulb into electricity and comprise a portion of a reflector of the vehicle headlamp.

19. The method as in claim 11, wherein the microcontroller configured to monitor amount of energy collected by the at least one multi-energy source module and the at least one solar energy source module and amount of energy delivered by the rechargeable battery to the safety light and configured to transmit a residual of the collected energy to power any electrical energy consumer line of a vehicle electrical system or save it in the same.

20. The method as in claim 11 further comprises using Multi-Energy Illuminating Technology for: collecting waste energy from the vehicle headlamp bulb that is not electrical energy delivered from a vehicle electrical system; collecting energy from outside of the vehicle headlamp bulb that is not electrical energy; transforming the collected non-electrical energies to electricity energy; storing the transformed electricity energy; monitoring by the microcontroller an amount of energy collected and an amount of energy delivered to the safety light; and transmitting a residual of the transformed electricity energy to power any electrical energy consumer line of the vehicle electrical system or saving the transformed electricity energy in a battery of the vehicle electrical system.

* * * * *